(12) United States Patent
Mizuno

(10) Patent No.: US 11,603,033 B2
(45) Date of Patent: Mar. 14, 2023

(54) CONTROL APPARATUS FOR VEHICLE HEADLIGHT

(71) Applicant: DENSO CORPORATION, Kariya (JP)

(72) Inventor: Ryu Mizuno, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/304,397

(22) PCT Filed: Feb. 25, 2015

(86) PCT No.: PCT/JP2015/055370
§ 371 (c)(1),
(2) Date: Oct. 14, 2016

(87) PCT Pub. No.: WO2015/159589
PCT Pub. Date: Oct. 22, 2015

(65) Prior Publication Data
US 2017/0028904 A1    Feb. 2, 2017

(30) Foreign Application Priority Data
Apr. 18, 2014  (JP) ............................. JP2014-086493

(51) Int. Cl.
*B60Q 1/14*    (2006.01)
(52) U.S. Cl.
CPC ........... *B60Q 1/1423* (2013.01); *B60Q 1/143* (2013.01); *B60Q 1/1438* (2013.01); *B60Q 2300/056* (2013.01); *B60Q 2300/41* (2013.01)
(58) Field of Classification Search
CPC .................. B60Q 1/143; B60Q 1/1438; B60Q 2300/056; B60Q 2300/41; B60Q 2300/42; B60Q 1/04; B60Q 2300/12; B60Q 1/1423; F21S 41/153; F21S 41/663
See application file for complete search history.

(56) References Cited

U.S. PATENT DOCUMENTS

| | | | | |
|---|---|---|---|---|
| 2012/0206043 A1* | 8/2012 | Yamazaki | ............... | B60Q 1/143 315/82 |
| 2013/0049587 A1* | 2/2013 | Nakadate | ................. | B60Q 1/08 315/82 |
| 2013/0218413 A1* | 8/2013 | Tanaka | ................... | B60Q 1/085 701/36 |
| 2013/0242100 A1* | 9/2013 | Seki | ......................... | B60Q 1/04 348/148 |

FOREIGN PATENT DOCUMENTS

| | | | | |
|---|---|---|---|---|
| DE | 2156984 A1 * | 2/2010 | ............. | B60Q 1/143 |
| EP | 2156983 A1 | 2/2010 | | |

(Continued)

*Primary Examiner* — Aniss Chad
*Assistant Examiner* — Madison R Hughes
(74) *Attorney, Agent, or Firm* — Maschoff Brennan

(57) ABSTRACT

A control apparatus (1) for vehicle headlight including a rear end detection unit (3, 7) that detects a rear end (117) of a preceding vehicle (111) and a light blocking area setting unit (7) that sets a light blocking area (123) that includes the rear end within a light illumination area of a headlight (101, 103) of an own vehicle (107), wherein the light blocking area setting unit sets the light blocking area such that a spreading extent (125, 127) of the light blocking area outside the rear end is wider on a side in which a front end of the preceding vehicle is present than on the opposite side with reference to the rear end as viewed from the own vehicle.

3 Claims, 8 Drawing Sheets

(56) References Cited

FOREIGN PATENT DOCUMENTS

| | | |
|---|---|---|
| EP | 2156984 A1 | 2/2010 |
| JP | 2013079044 A * | 5/2013 |
| JP | 2013-147111 A | 8/2013 |
| JP | 2013-184602 A | 9/2013 |
| JP | 2013-193644 A | 9/2013 |

* cited by examiner

|  | A | B | C |
|---|---|---|---|
| LEFT COMPENSATION AMOUNT | 1deg | 3deg | 1deg |
| RIGHT COMPENSATION AMOUNT | 3deg | 1deg | 1deg |

CONTROL APPARATUS FOR VEHICLE HEADLIGHT

TECHNICAL FIELD

The present invention relates to a control apparatus for a vehicle headlight.

BACKGROUND ART

When a preceding vehicle enters an illumination area of a headlight of an own vehicle while the own vehicle is driven at night, glare may be caused. Accordingly, in recent years, there is proposed a technique in which a position of a preceding vehicle is detected, and a light blocking area is set in an illumination area of a headlight such that the detected position is not illuminated (see patent literature 1).

CITATION LIST

Patent Literature

[PTL1] Japanese Patent Application Laid-open No. 2013-43623

SUMMARY OF INVENTION

Technical Problem

Detection of a preceding vehicle is performed by detecting its rear end (taillamp). The light blocking area is set centered basically at the rear end of the preceding vehicle, and compensated in accordance with a moving direction in the horizontal direction of the preceding vehicle in a camera image.

Depending on the position or the moving direction of the preceding vehicle relative to the own vehicle, it may occur that the position of a side mirror of the preceding vehicle is far apart from the position of the rear end of the preceding vehicle. In this case, glare may be caused if the position of the side mirror of the preceding vehicle is outside the light blocking area even when the light blocking area is set as above.

The present invention has been made in view of the above point, and the purpose thereof is to provide a control apparatus for a vehicle headlight which is capable of solving the above described problem.

Solution to Problem

The control apparatus for a vehicle headlight of the present invention includes a rear end detection unit for detecting a rear end of a preceding vehicle, and a light blocking area setting unit for setting a light blocking area within a light illumination area of an own vehicle. In the control apparatus for a vehicle headlight of the present invention, the light blocking area setting unit sets the light blocking area such that the spreading extent of the light blocking area outside of the rear end on a side in which a front end of the preceding vehicle is present is wider than on the opposite side with reference to the rear end of the preceding vehicle as viewed from the own vehicle.

Advantageous Effect of the Invention

The control apparatus for a vehicle headlight of the present invention is capable of suppressing glare even when the position of a side mirror of a preceding vehicle is far apart from the position of the rear end of the preceding vehicle as viewed from the own vehicle.

DESCRIPTION OF EMBODIMENTS

An embodiment of the present invention is explained with reference to the drawings.

First Embodiment

Figure 1:
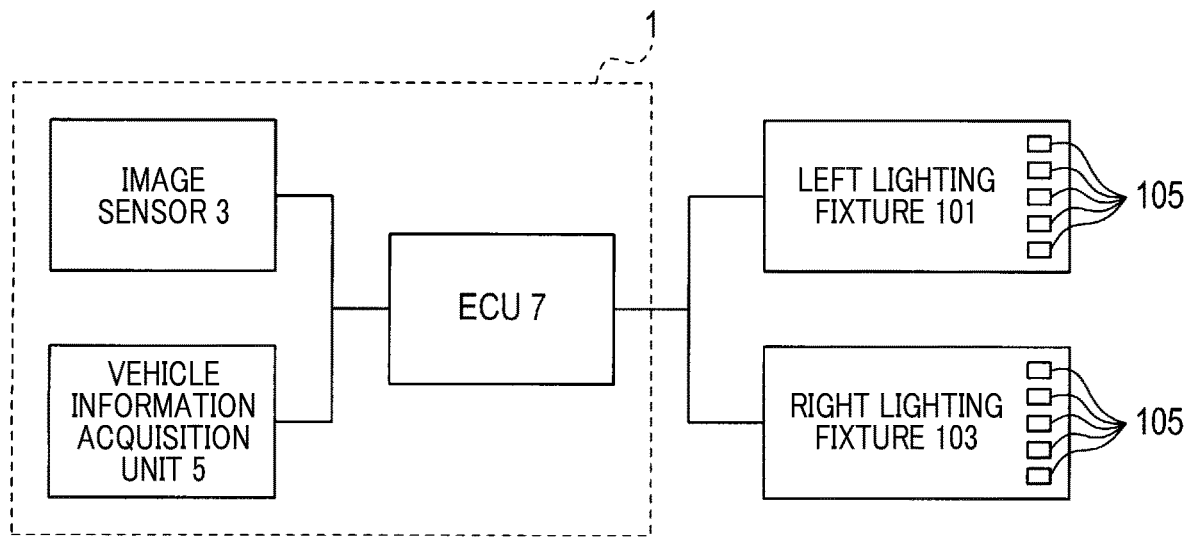
FIG. 1 is a block diagram showing the structure of a control apparatus 1.
Figure 2:
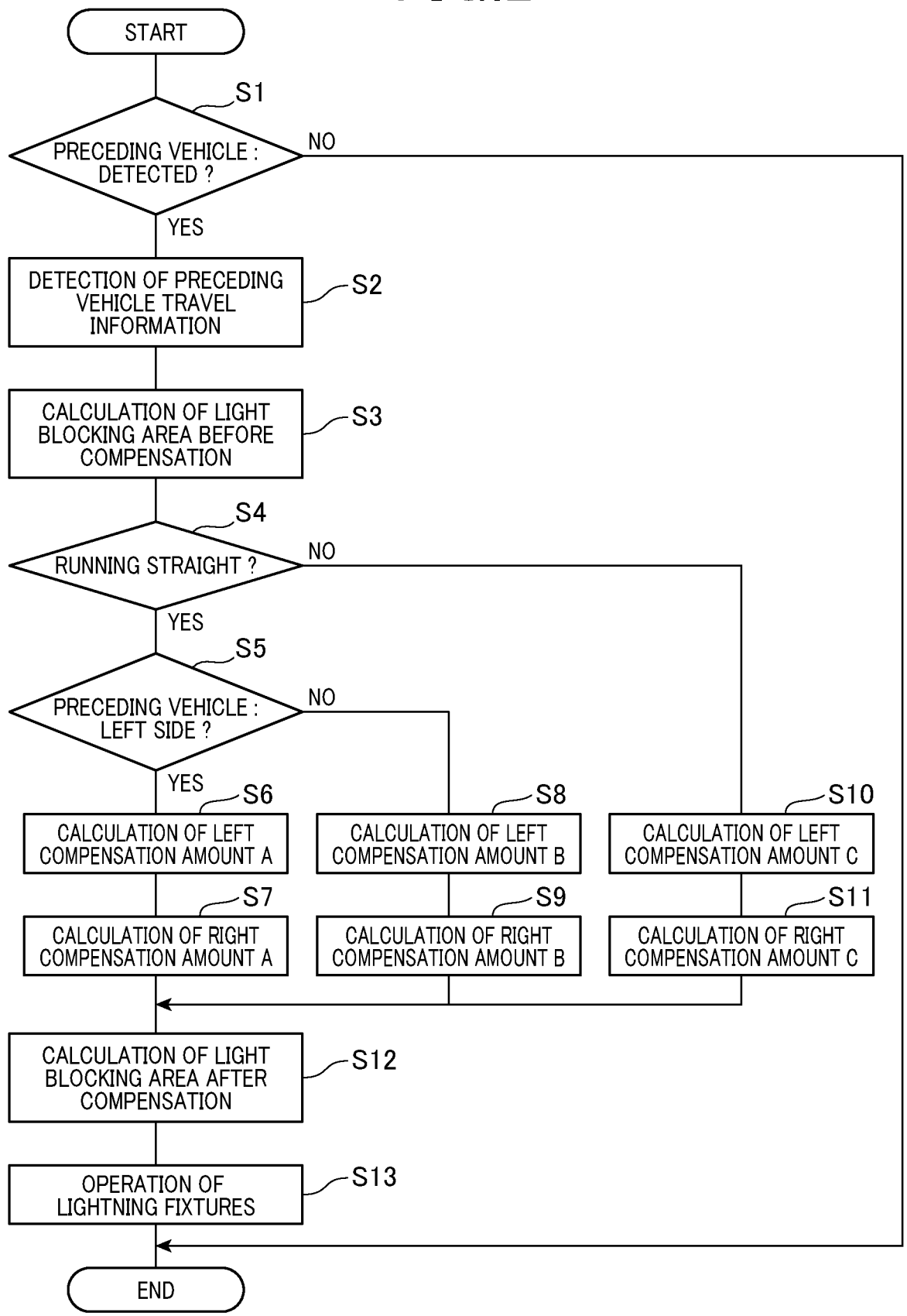
FIG. 2 is a flowchart showing a process performed by the control apparatus 1.

1. The structure of a Control Apparatus 1:

The structure of the control apparatus 1 is explained based on FIG. 1. The control apparatus 1 is a vehicle-mounted apparatus mounted on a vehicle (referred to as the own vehicle hereinafter). The control apparatus 1 controls a pair of left and right headlights (a left lighting fixture 101 and a right lighting fixture 103). As shown in FIG. 1, the control apparatus 1 includes an image sensor 3, a vehicle information acquisition unit 5 and an ECU 7.

The image sensor 3 acquires an image ahead of the own vehicle, and outputs data of this image to the ECU 7. The vehicle information acquisition unit 5 acquires various information regarding the own vehicle (the vehicle speed, yaw rate, position, travel direction and so on), and outputs the acquired information to the ECU 7. The vehicle speed and the yaw rate of the own vehicle can be acquired using a well-known wheel speed sensor, a yaw rate sensor or the like. The position and the travel direction of the own vehicle can be acquired using a GPS.

The vehicle information acquisition unit 5 can acquire a presence or absence, position, direction relative to the own vehicle, distance from the own vehicle and so on of other vehicle (a preceding vehicle running in front of (or diagonally in front of) the own vehicle, for example) using a millimeter-wave sensor or the like.

The ECU 7, which is a computer including a CPU, a ROM, a RAN and so on, controls the left lighting fixture 101 and the right lighting fixture 103. This control is well-known control including turning on/off, switching of light axis directions (switching between high beam and low beam) of the left lighting fixture 101 and the right lighting fixture 103. Further, the ECU 7 performs a process for setting a light blocking area in an illumination area of the left lighting fixture 101 and the right lighting fixture 103. The setting process of this light blocking area is described later.

Each of the left lighting fixture 101 and the right lighting fixture 103 includes a light source in which a plurality of light emitting elements 105 are arranged in a line in the horizontal direction, and is capable of emitting the light of the light source forward of the own vehicle. The ECU 7 controls switching on/off of the respective light emitting elements 105 individually. By turning on part of the light emitting elements 105 and turning off the others in accordance with a specific pattern, it is possible to set a light blocking area (i.e., referred to as "an unilluminated area" in the claims) which is unilluminated partially within the illumination area of the left lighting fixture 101 and the right lighting fixture 103.

The image sensor 3 and the ECU 7 are one example of a rear end detection means. The ECU 7 is one example of a light blocking area setting means.

2. Alight Blocking Area Setting Process Performed by the Control Apparatus 1:

The control apparatus 1 (particularly the ECU 7) performs repeatedly at predetermined time intervals is explained based on FIGS. 2 to 5. In step S1 of FIG. 2, it is determined whether or not a preceding vehicle has been detected. That is, a well-known image recognition process is performed on images acquired by the image sensor 3 to determine whether or not a rear end (a portion including a taillamp) of the preceding vehicle can be recognized. If a preceding vehicle (a rear end of a preceding vehicle) has been detected, the process proceeds to step S2, and otherwise, the process is terminated.

Figure 3:
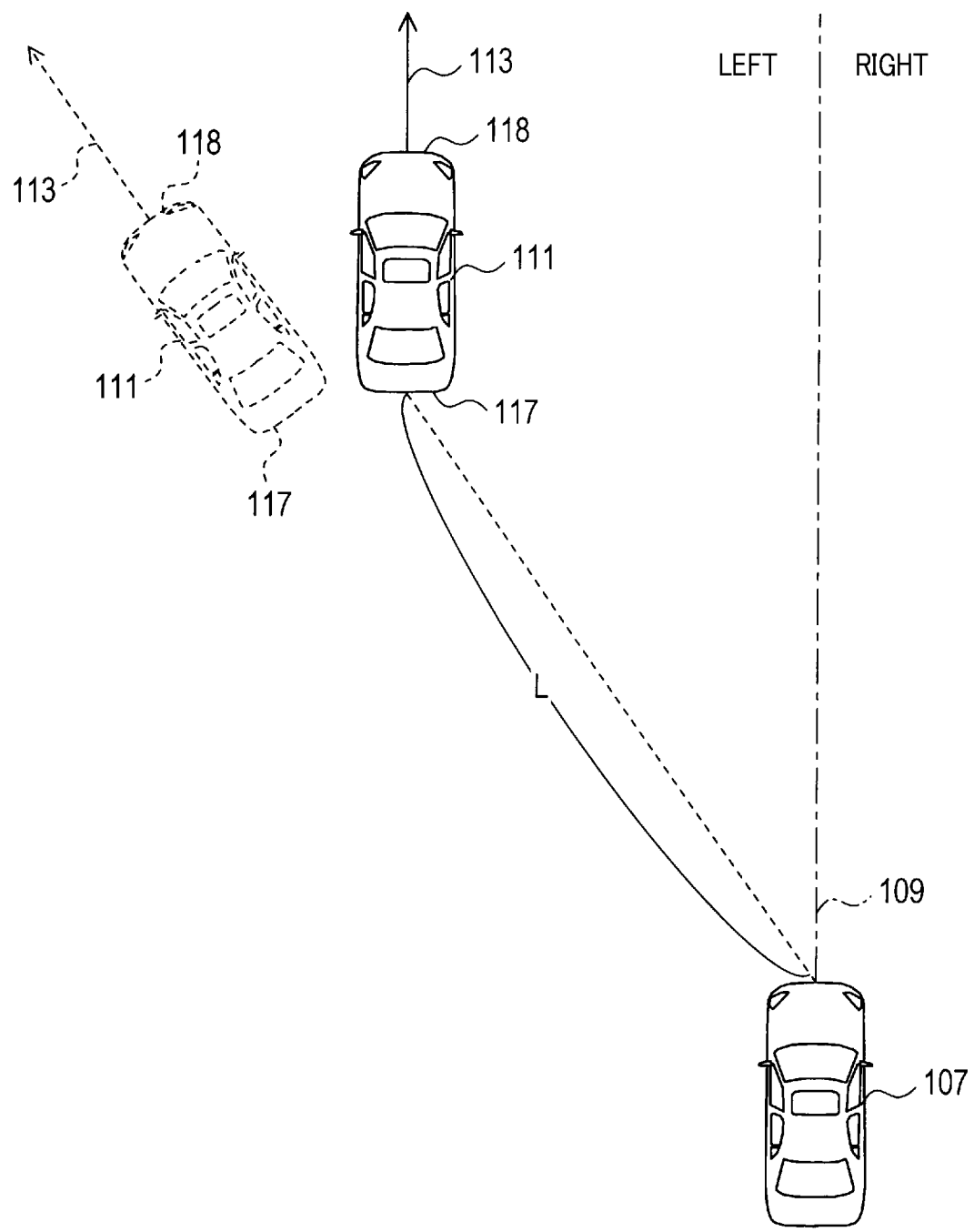
FIG. 3 is an explanatory view showing a positional relation between an own vehicle 107 and a preceding vehicle 111.

In step S2, travel information of the preceding vehicle is detected. Specifically, as shown in FIG. 3, it is determined whether the preceding vehicle 111 is present on the right side or left side as viewed from the own vehicle 107 (with reference to the travel direction 109 of the own vehicle 107).

In this step S2, also the direction of the rear end 117 of the preceding vehicle 111 as viewed from the own vehicle 107 and a distance L from the own vehicle 107 to the rear end 117 are detected. For this detection, images acquired by the image sensor 3 and the output signal of the millimeter-wave sensor acquired by the vehicle information acquisition unit 5 and so on can be used.

Further, in this step S2, it is detected whether the preceding vehicle 111 is running straight in the same direction as the own vehicle 107 (whether the travel direction 113 of the preceding vehicle 111 is parallel to the travel direction 109 of the own vehicle 107) or the preceding vehicle 111 is turning.

The travel direction 113 of the preceding vehicle 111 can be identified by any one of the following methods (a) to (c).

(a) Images from the image sensor 103 are acquired repeatedly at predetermined time intervals, from which a locus which the rear end 117 of the preceding vehicle 111 follows with passage of time is acquired. From this locus, the travel direction 113 of the preceding vehicle 111 is identified.

(b) Map data including the road on which the preceding vehicle 111 is running is acquired, from which the travel direction 113 of the preceding vehicle 111 is identified.

(c) Images of the preceding vehicle 111 are acquired, from which the direction from the rear end 117 to the front end 118 of the preceding vehicle 111 (that is, the travel direction 113 of the preceding vehicle 111) is identified.

In step S3, a light blocking area before compensation is calculated. As shown in 4A of FIGS. 4 and 4B of FIG. 4, this light blocking area 115 before compensation (i.e., referred to as "a pre-compensation area" in the claims) is an area in which the light is partially blocked within the illumination area of the left lighting fixture 101 or the right lighting fixture 103, and which covers the rear end 117 of the preceding vehicle 111. More specifically, it is an area whose right boundary is the right taillamp 119 (the right end of the rear end 117) and whose left boundary is the left taillamp 121 (the left end of the rear end 117).

In step S4, it is determined whether or not the preceding vehicle is running straight in the same direction as the own vehicle based on the travel information of the preceding vehicle acquired in the above step S2. If the preceding vehicle is running straight in the same direction as the own vehicle, the process proceeds to step S5 and otherwise proceeds to step S10.

In step S5, it is determined whether or not the preceding vehicle is present on the left side as viewed from the own vehicle (with reference to the travel direction of the own vehicle) based on the travel information of the preceding vehicle acquired in the above step S2. If it is present on the left side, the process proceeds to step S6, and otherwise (if it is present on the right side) proceeds to step S8.

Figure 4:
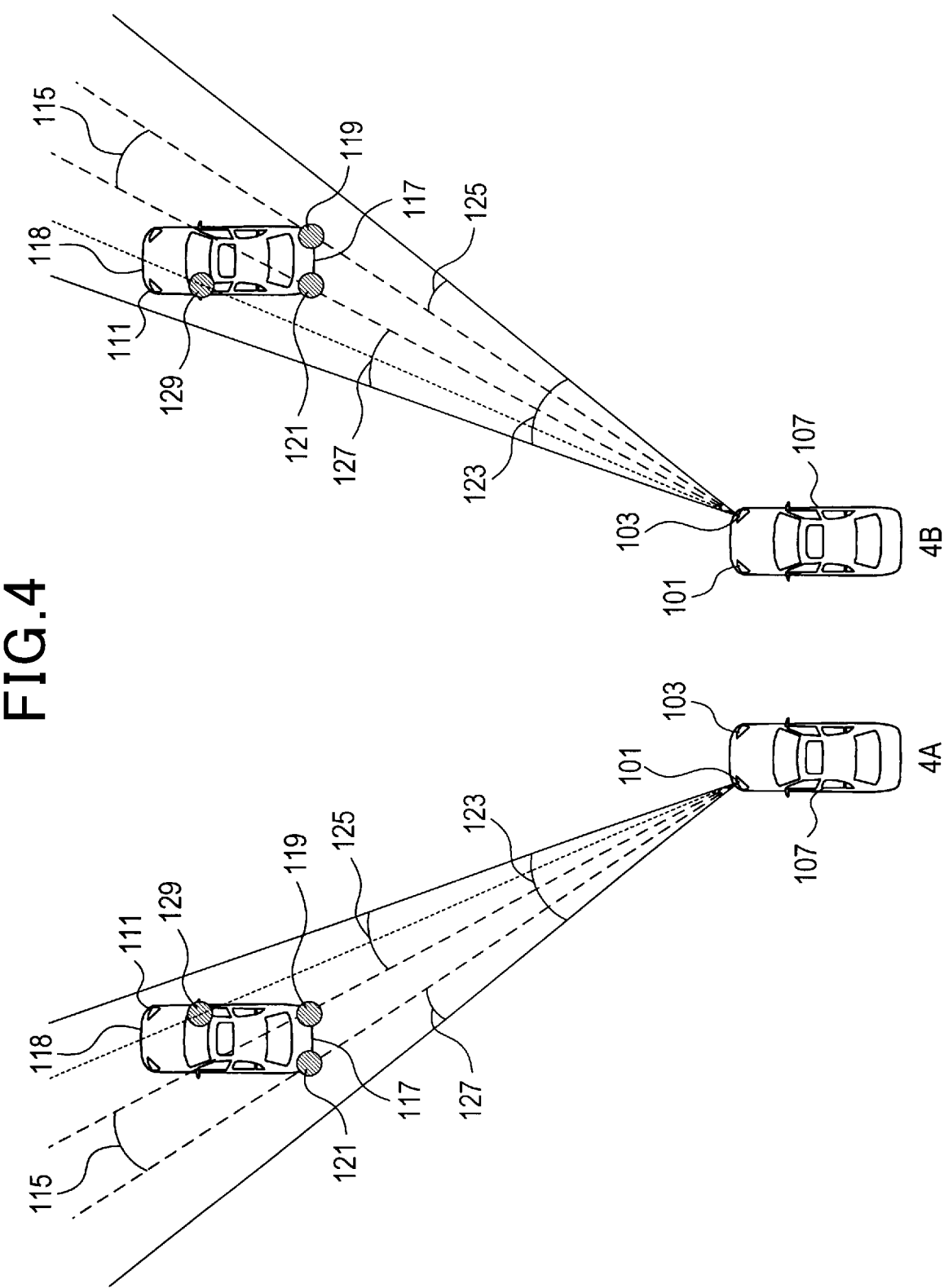
FIG. 4 is an explanatory view showing, in 4A, a light blocking area when the preceding vehicle 111 is running straight on the left side of the own vehicle 107, and showing, in 4B, a light blocking area when the preceding vehicle 111 is running straight on the right side of the own vehicle 107.
Figures 5, 6:
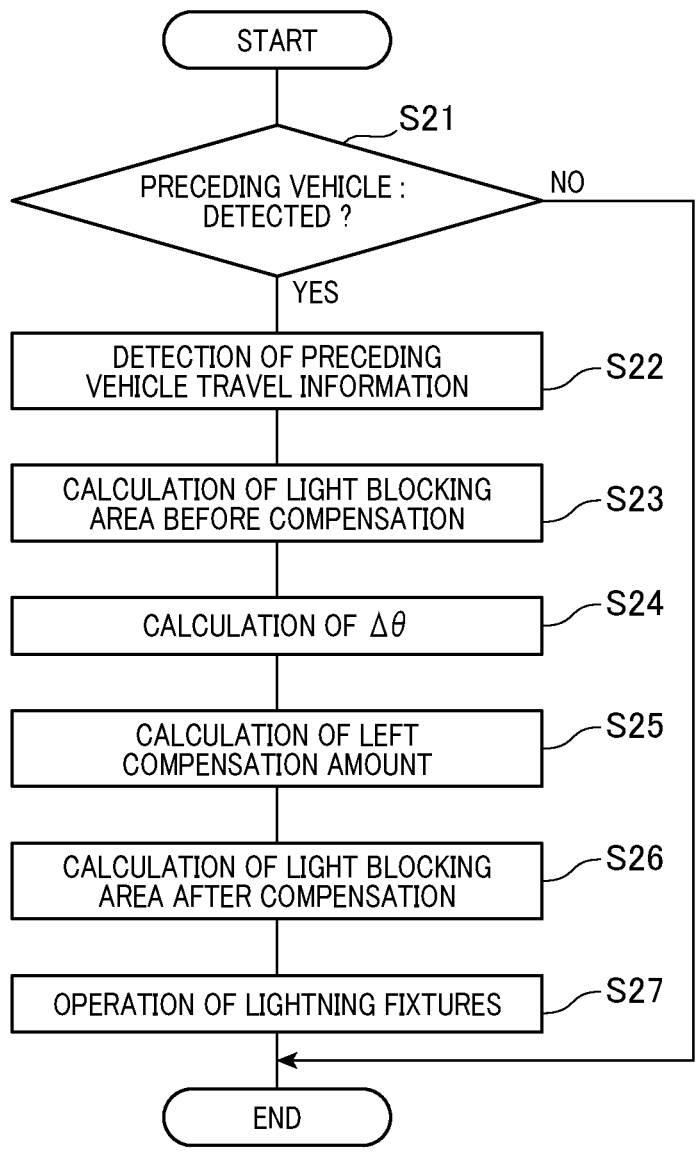
FIG. 5 is an explanatory view showing an example of a right compensation amount and a left compensation amount.
FIG. 6 is a flowchart showing a process performed by the control apparatus 1.

When the determination result in this step S5 is affirmative, the front end 118 of the preceding vehicle 111 is present on the right side with reference to the rear end 117 as viewed from the own vehicle 107 as shown in 4A of FIG. 4. When the determination result in this step S5 is negative, the front end 118 of the preceding vehicle 111 is present on the left side with reference to the rear end 117 as viewed from the own vehicle 107 as shown in 4B of FIG. 4.

In step S6, a left compensation amount A is calculated. In step S7, a right compensation amount A is calculated. The left compensation amount A and the right compensation amount A are stored in advance in the ROM of the ECU7, and can be read from there. The value of the right compensation amount A is larger than the value of the left compensation amount A. The values of the left compensation amount A and the right compensation amount A may be those shown in FIG. 5, for example.

In step S8, a left compensation amount B is calculated. In step S9, a right compensation amount B is calculated. The left compensation amount B and the right compensation amount B are stored in advance in the ROM of the ECU7, and can be read from there. The value of the left compensation amount B is larger than the value of the right compensation amount B. The values of the left compensation amount B and the right compensation amount B may be those shown in FIG. 5, for example.

On the other hand, when the determination result in step S4 is negative and the process proceeds to step S10, a left compensation amount C is calculated in this step S10, and a right compensation amount C is calculated in step S11. The left compensation amount C and the right compensation amount C are stored in advance in the ROM of the ECU 7, and can be read from there. The value of the right compensation amount C is equal to the value of the left compensation amount C. The values of the left compensation amount C and the right compensation amount C may be those shown in FIG. 5, for example.

In step S12, a light blocking area after compensation is calculated. As shown in 4A of FIGS. 4 and 4B of FIG. 4, this light blocking area 123 after compensation is an area in which the light of the illumination area of the left lighting fixture 101 or the right lighting fixture 103 is partially blocked, and which is joined with the right compensation amount 125 on the right side of the light blocking area 115 before compensation and joined with the left compensation amount 127 on the left side. That is, the light blocking area 123 after compensation extends to the outside of the rear end 117, the spreading extent on the right side of the rear end 117 being the right compensation amount 125, and the spreading extent on the left side of the rear end 117 being the left compensation amount 127.

The right compensation amount 125 is the right compensation amount A when the process of step S7 has been performed, the right compensation amount B when the process of step S9 has been performed, and the right compensation amount C when the process of step S11 has been performed.

The left compensation amount 125 is the left compensation amount A when the process of step S6 has been performed, the left compensation amount B when the process of step S8 has been performed, and the left compensation amount C when the process of step S10 has been performed.

In step S13, the left lighting fixture 101 and the right lighting fixture 103 are caused to operate using the light blocking area after compensation calculated in the above step S12. That is, the light blocking area after compensation calculated in the above step S12 is set within the illumination area of the left lighting fixture 101 and the right lighting fixture 103.

The right compensation amount 125 and the left compensation amount 127 is one example of the spreading extent of the light blocking area outside the rear end 117.

3. Advantages Provided by the Control Apparatus 1:

When the preceding vehicle 111 is running straight in the same direction as the own vehicle 107, and is present on the left side as viewed from the own vehicle 107 (when the front end 118 of the preceding vehicle 111 is present on the right side with reference to the rear end 117 of the preceding vehicle 111 as viewed from the own vehicle 107) as shown in 4A of FIG. 4, the control apparatus 1 sets the right compensation amount 125 larger than the left compensation amount 127.

When the preceding vehicle 111 is running straight in the same direction as the own vehicle 107, and is present on the right side as viewed from the own vehicle 107 (when the front end 118 of the preceding vehicle 111 is present on the left side with reference to the rear end 117 of the preceding vehicle 117 as viewed from the own vehicle 107) as shown in 4B of FIG. 4, the control apparatus 1 sets the left compensation amount 127 larger than the right compensation amount 125.

That is, the compensation amount applied to the light blocking area 115 before compensation (the spreading extent outside the light blocking area 115 before compensation) is larger on the side on which the front end 118 is present than on the side opposite to it.

Therefore, even when the position of the side mirror 129 of the preceding vehicle 111 is far apart from the position of the rear end 117 of the preceding vehicle 111, the side mirror 129 is included in the light blocking area 123 after compensation. Hence, the control apparatus 1 can suppress glare.

Second Embodiment

1. The structure of the Control Apparatus 1:

The control apparatus 1 of this embodiment has the structure similar to the above described first embodiment.

2. The process Performed by the Control Apparatus 1:

The process which the control apparatus 1 performs is explained based on FIGS. 6 to 9. In step S21 of FIG. 6, it is determined whether or not a preceding vehicle has been detected like in the above described step S1. If a preceding vehicle (a rear end of a preceding vehicle) has been detected, the process proceeds to step S22. If no preceding vehicle has been detected, the process is terminated.

Figure 7:
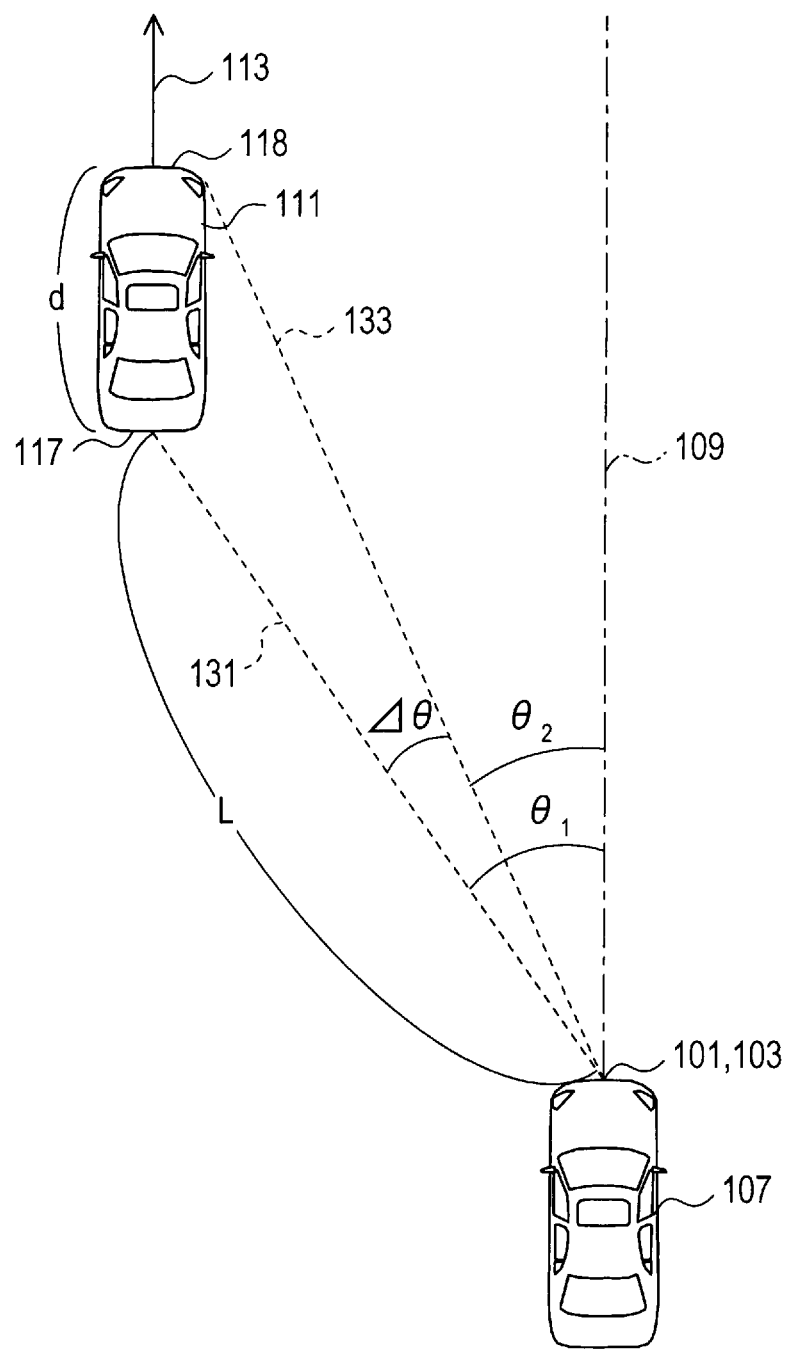
FIG. 7 is an explanatory view showing a light blocking area when the preceding vehicle 111 is running straight on the left side of the own vehicle 107.
Figure 8:
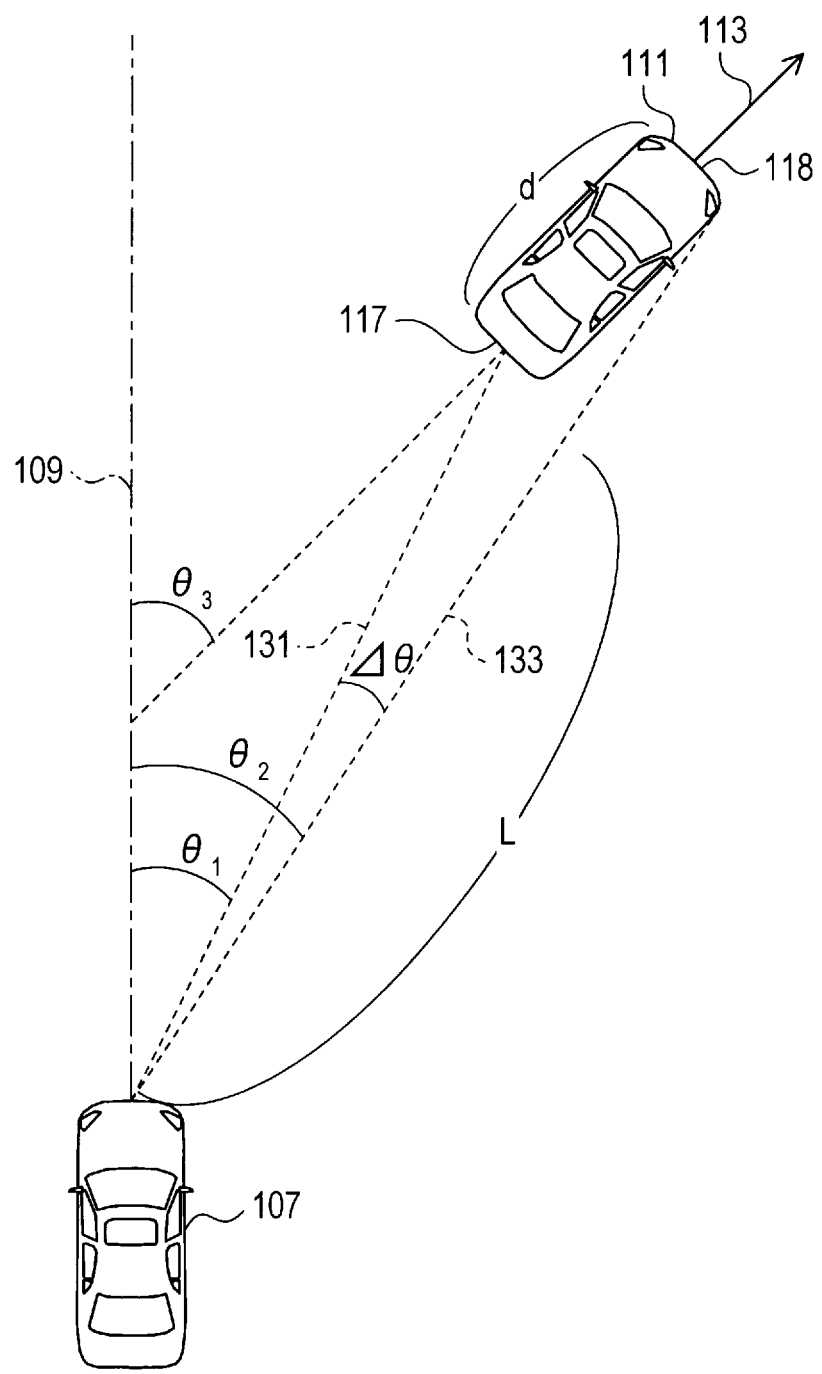
FIG. 8 is an explanatory view showing a light blocking area when the preceding vehicle 111 is turning on the right side of the own vehicle 107.
Figure 9:
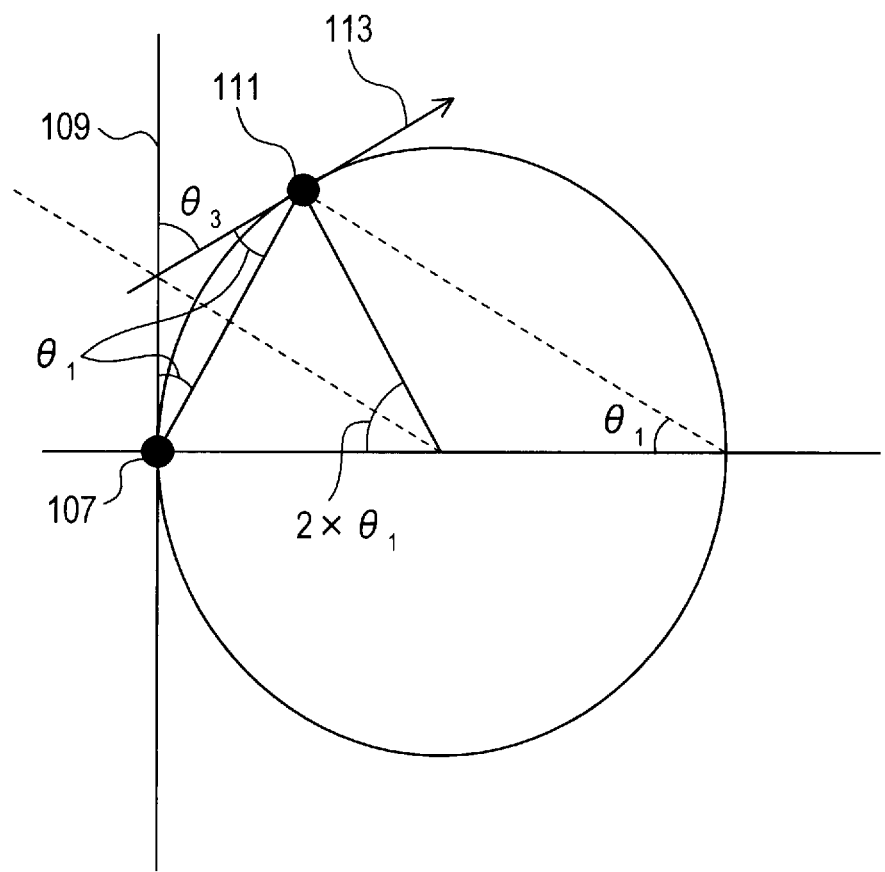
FIG. 9 is an explanatory view showing a relation between an angle $\theta_1$ and an angle $\theta_3$ (to be explained later) with the preceding vehicle 111 running on a road of constant R.

In step S22, travel information of the preceding vehicle is detected like in the above described step S2. In step S23, a light blocking area before compensation is calculated like in the above described step S3. In step S24, $\Delta\theta$ (i.e., referred to as "a difference angle" in the claims) shown in FIGS. 7 and 8 is calculated. This $\Delta\theta$ is as follows. The direction from the left lighting fixture 101 or the right lighting fixture 103 to the rear end 117 of the preceding vehicle 111 is designated by 131, and the direction from the left lighting fixture 101 or the right lighting fixture 103 to the front end 118 of the preceding vehicle 111 is designated by 133. The angle formed by the travel direction 109 of the own vehicle 107 and the direction 131 is designated by $\theta 1$ (i.e., referred to as "a second angle" in the claims). The angle formed by the travel direction 109 and the direction 133 is designated by $\theta 2$ (i.e., referred to as "a first angle" in the claims). The difference between $\theta 1$ and $\theta 2$ is designated by $\Delta\theta$. That is, $\Delta\theta$ is the angle formed by the direction 133 of the front end 118 of the preceding vehicle 111 as viewed from the own vehicle 107 and the direction 131 of the rear end 117 as viewed from the own vehicle 107.

In FIGS. 7 and 8, when the direction 133 is more clockwise than the direction 131, the value of $\Delta\theta$ is positive, and when the direction 133 is more anticlockwise than the direction 131, the value of $\Delta\theta$ is negative. Accordingly, the value of $\Delta\theta$ is positive when the front end 118 is on the right side with reference to the rear end 117 as viewed from the own vehicle 107, while it is negative when the front end 118 is on the left side with reference to the rear end 117.

$\Delta\theta$ can be calculated as the difference between the above described $\theta_1$ and $\theta_2$. $\theta 1$ can be calculated from the direction of the rear end 117 extracted from an image acquired by the image sensor 3. $\theta_2$ can be calculated from $\theta_1$, the distance L from the own vehicle 107 to the rear end of the preceding vehicle 111, the longitudinal length d of the preceding vehicle 111, and 63 formed by the travel direction 109 of the own vehicle and the travel direction 113 of the preceding vehicle 111. FIG. 7 shows a case where $\theta_3$ is 0.

The length L can be calculated using images acquired by the image sensor 3, the output signal of the millimeter-wave sensor acquired by the vehicle information acquisition unit 5, or the like. The length d can be calculated based on a result of estimation of vehicle type (passenger car, large-size vehicle and so on) of the preceding vehicle made from the distance between the taillamps 119 and 121. By storing the length d for each vehicle type in the ROM of the ECU 7 in advance, it is possible to read the length d corresponding to the estimated vehicle type.

By acquiring a locus which the rear end 117 follows with passage of time as viewed from the own vehicle 107, $\theta_3$ can be calculated based on this locus. Also, $\theta_3$ can be calculated based map data showing the shape of the road on which the preceding vehicle 111 is running. Further, by estimating the direction from the rear end 117 to the front end 118 of the preceding vehicle 111 (that is, the travel direction 113 of the preceding vehicle 111) based on images acquired by the image sensor 3, $\theta_3$ can be calculated using this estimation result.

When the preceding vehicle 111 is running on a road of constant R, the value of $\theta_3$ is approximately twice that of $\theta_1$. This can be proved geometrically from the drawing shown in FIG. 9. Accordingly, when the preceding vehicle 111 is running on a road of constant R, $\theta_3$ can be calculated from $\theta_1$.

In step S25, the right compensation amount and the left compensation amount are calculated based on $\Delta\theta$ calculated in the above step S24. Specifically, it is performed in the following way. When the value of $\Delta\theta$ is positive (when the front end 118 of the preceding vehicle 111 is on the right side with reference to the rear end 117 as viewed from the own vehicle 107), the right compensation amount is set larger than the left compensation amount. The right compensation amount is increased with the increase of the absolute value of $\Delta\theta$.

The left compensation amount has a fixed value.

When the value of $\Delta\theta$ is negative (when the front end 118 of the preceding vehicle 111 is on the left side with reference to the rear end 117 as viewed from the own vehicle 107), the left compensation amount is set larger than the right compensation amount. The left compensation amount is increased with the increase of the absolute value of $\Delta\theta$. The right compensation amount has a fixed value.

In step S26, the light blocking area after compensation is calculated. The light blocking area after compensation is the light blocking area before compensation calculated in the above step S23 joined with the right compensation amount on the right side thereof and joined with the left compensation amount on the left side thereof.

In step S27, the left lighting fixture 101 and the right lighting fixture 103 are caused to operate using the light blocking area after compensation calculated in step S26. That is, the light blocking area after compensation calculated in step S26 is set within the illumination area of the left lighting fixture 101 and the right lighting fixture 103.

3. Advantages Provided by the Control Apparatus 1:

(1) The control apparatus 1 provides advantages similar to those of the above described first embodiment.

(2) The control apparatus 1 can set a light blocking area compensation amount (a light blocking area spreading extent outside the light blocking area 115 before compensation) such that it is larger on the side on which the front end 118 is present than that at the opposite side even when the preceding vehicle 111 is turning. This makes it possible to suppress glare even when the preceding vehicle 111 is turning.

(3) The control apparatus 1 increases the light blocking area compensation amount with the increase of the absolute value of $\Delta\theta$. This make it possible to reduce glare even when the absolute value of $\Delta\theta$ is large (even when the side mirror of the preceding vehicle is far apart from the rear end of the preceding vehicle as viewed from the own vehicle), because the side mirror is included in the light blocking area after compensation.

Other Embodiments (1) In the first and second embodiments, the left lighting fixture 101 and the right lighting fixture 103 may be provided with a mask for blocking part of the light of the light source. The ECU 7 can set the light blocking area by changing the position and the size of the mask.

(2) In the second embodiment, the length d may be a distance from the rear end (taillamp) to the side mirror of the preceding vehicle.

(3) in the second embodiment, the length d may be acquired through inter-vehicle communication between the own vehicle and the preceding vehicle. Further, the distance d may be estimated by vehicle type recognition using the image sensor 3, or light detection (side marker lamp, side winker, headlight leakage light) by the image sensor 3.

(4) In the first and second embodiment, the process in which the light blocking area before compensation is set and then it is compensated may not be gone through. For example, a light blocking are which is the same as the light blocking area after compensation in the first or second embodiment may be set without setting the light blocking area before compensation.

(5) All or part of the structures of the first and second embodiments may be combined appropriately.

EXPLANATION OF REFERENCE SIGNS

1 . . . control apparatus, 3 . . . image sensor, 5 . . . vehicle information acquisition unit, 7 . . . ECU, 101 . . . left lighting fixture, 103 . . . right lighting fixture, 105 . . . light emitting element, 107 . . . own vehicle, 111 . . . preceding vehicle, 115 . . . light blocking area before compensation, 117 . . . rear end, 118 . . . rear end, 119, 121 . . . taillamp, 123 . . . light blocking area after compensation, 129 . . . side mirror

The invention claimed is:

1. A control apparatus for controlling headlights of an own vehicle to reduce headlight glare from the own vehicle that is experienced by a driver of a preceding vehicle by inhibiting illumination of the preceding vehicle, the preceding vehicle being positioned within an unilluminated area within an illuminated area of the own vehicle, the illuminated area being illuminated by the headlights of the own vehicle, the control apparatus comprising:

a processor;

a non-transitory computer-readable storage medium; and a set of computer-executable instructions stored on the non-transitory computer-readable storage medium that cause the processor to:

detect a left lighting fixture and a right lighting fixture of the preceding vehicle;

determine whether the preceding vehicle is present on a right side or a left side of the own vehicle;

determine boundaries of the unilluminated area within the illuminated area, the preceding vehicle being positioned within the unilluminated area;

control the headlights of the own vehicle to form the unilluminated area within the illuminated area by switching off certain light emitting elements within the headlights while maintaining other light emitting elements in an on state, the preceding vehicle being positioned within the unilluminated area within the illuminated area to reduce headlight glare from the own vehicle that is experienced by the driver of the preceding vehicle, wherein the unilluminated area comprises:

a pre-compensation area defined by an unilluminated region between the left lighting fixture and the right lighting fixture of the preceding vehicle;

a left compensation amount positioned on a left side of the pre-compensation area that extends the unilluminated area beyond the left lighting fixture of the preceding vehicle in a lateral direction; and a right compensation amount positioned on a right side of the pre-compensation area that extends the unilluminated area beyond the right lighting fixture of the preceding vehicle in the lateral direction;

wherein both the left compensation amount and the right compensation amount are varied depending on whether the preceding vehicle is present on the right side or the left side of the own vehicle, and for a state in which the preceding vehicle is positioned on the right side of the own vehicle, the left compensation amount is greater than the right compensation amount, and for a state in which the preceding vehicle being positioned on the left side of the own vehicle, the right compensation amount is greater than the left compensation amount, and wherein one of the left compensation amount and the right compensation amount is calculated based on a difference angle $\Delta\theta$ calculated by subtracting a first angle $\theta 2$ from a second angle $\theta 1$, the first angle $\theta 2$ being formed between a first virtual line and the travel direction of the own vehicle, the first virtual line connecting between the headlights of the own vehicle and a right front end of the preceding vehicle, and the second angle $\theta 1$ formed between a second virtual line and the travel direction of the own vehicle, the second virtual line connecting between the headlights of the own vehicle and a center of a rear end of the preceding vehicle, and wherein in response to the difference angle $\Delta\theta$ having a positive value, the right compensation amount is increased by an absolute value of the difference angle $\Delta\theta$, and in response to the difference angle $\Delta\theta$ having a negative value, the left compensation amount is increased by an absolute value of the difference angle $\Delta\theta$.

2. The control apparatus according to claim 1, wherein the set of computer-executable instructions stored on the non-transitory computer-readable storage medium further cause the processor to determine whether the preceding vehicle is running straight in a same direction as the own vehicle, and in response to the preceding vehicle running straight in the same direction as the own vehicle and positioned on the right side or the left side of the own vehicle, the left compensation amount and the right compensation amount are varied such that the one of the left compensation amount and the right compensation amount is greater than the other of the left compensation amount and the right compensation amount depending on which of the left compensation amount and the right compensation amount is on a side of the preceding vehicle that is opposite of the own vehicle.

3. The control apparatus according to claim 1, wherein the set of computer-executable instructions stored on the non-transitory computer-readable storage medium further cause the processor to calculate the left compensation amount and the right compensation amount in response to determining that the preceding vehicle is traveling in a same direction as the own vehicle and positioned on the right side or the left side of the own vehicle in the lateral direction.

* * * * *